United States Patent Office 3,613,479
Patented Oct. 19, 1971

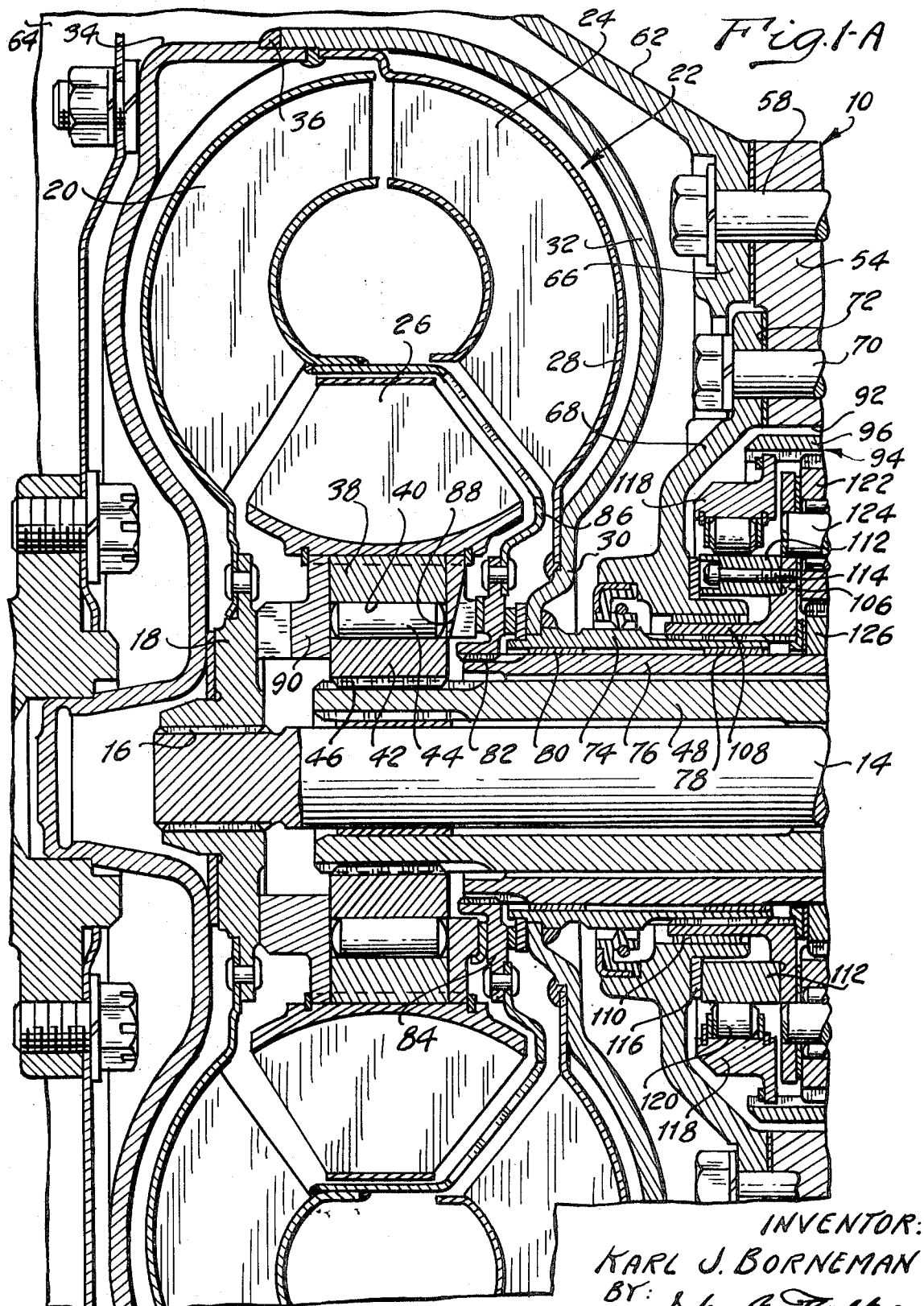
Fig.1-A

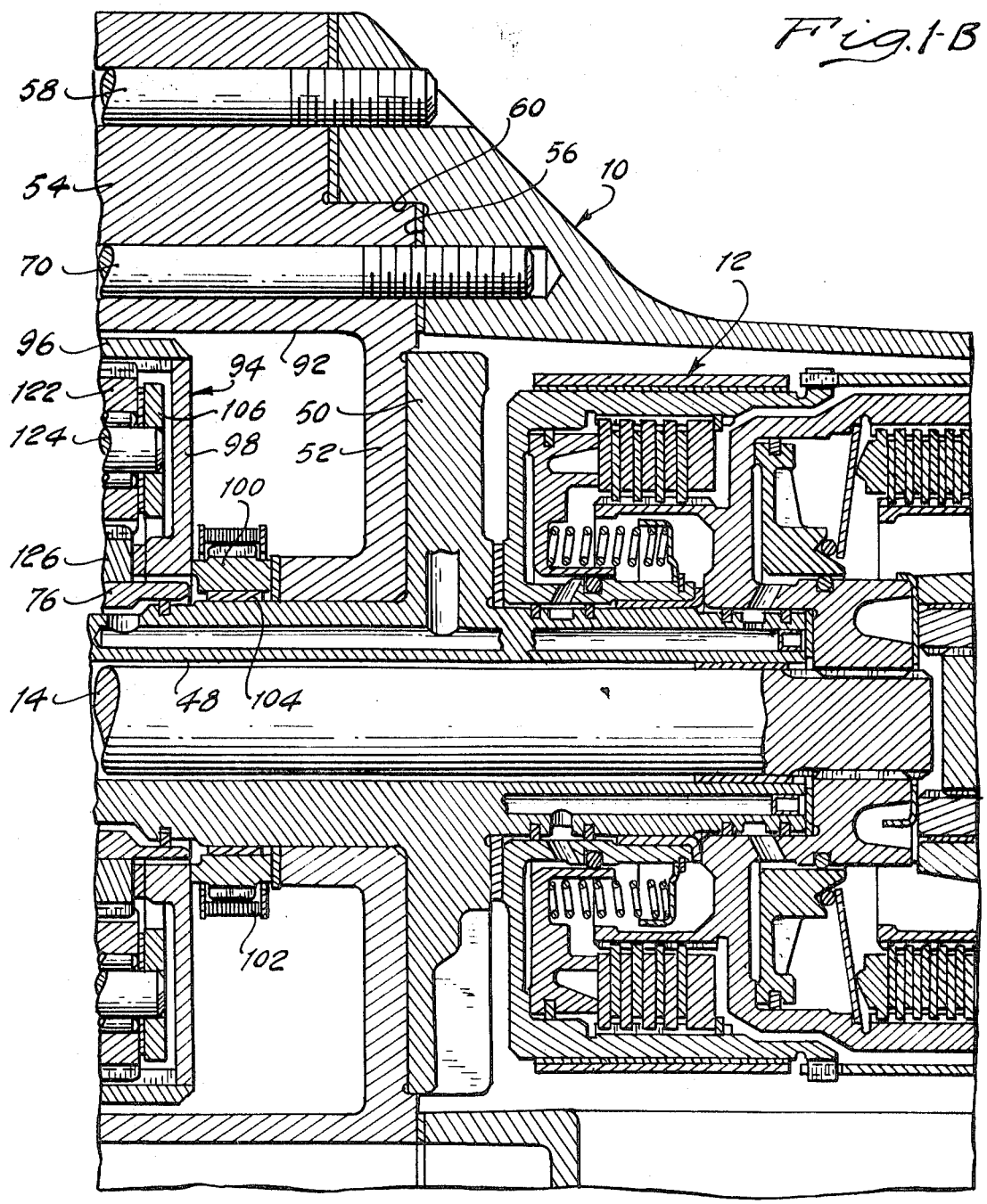

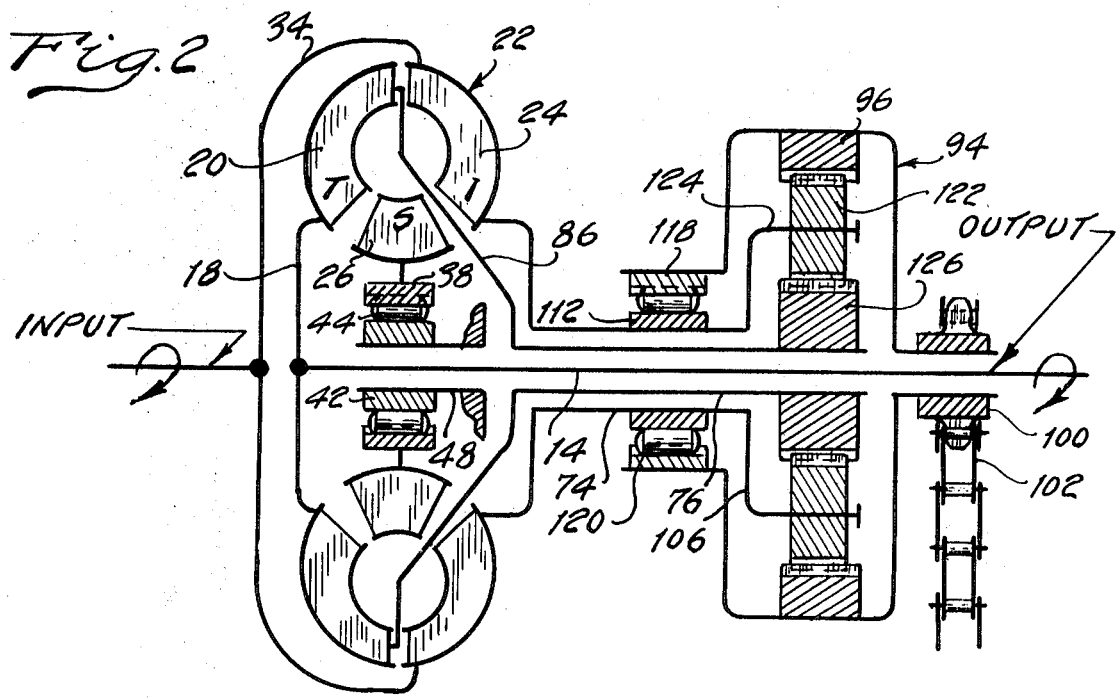

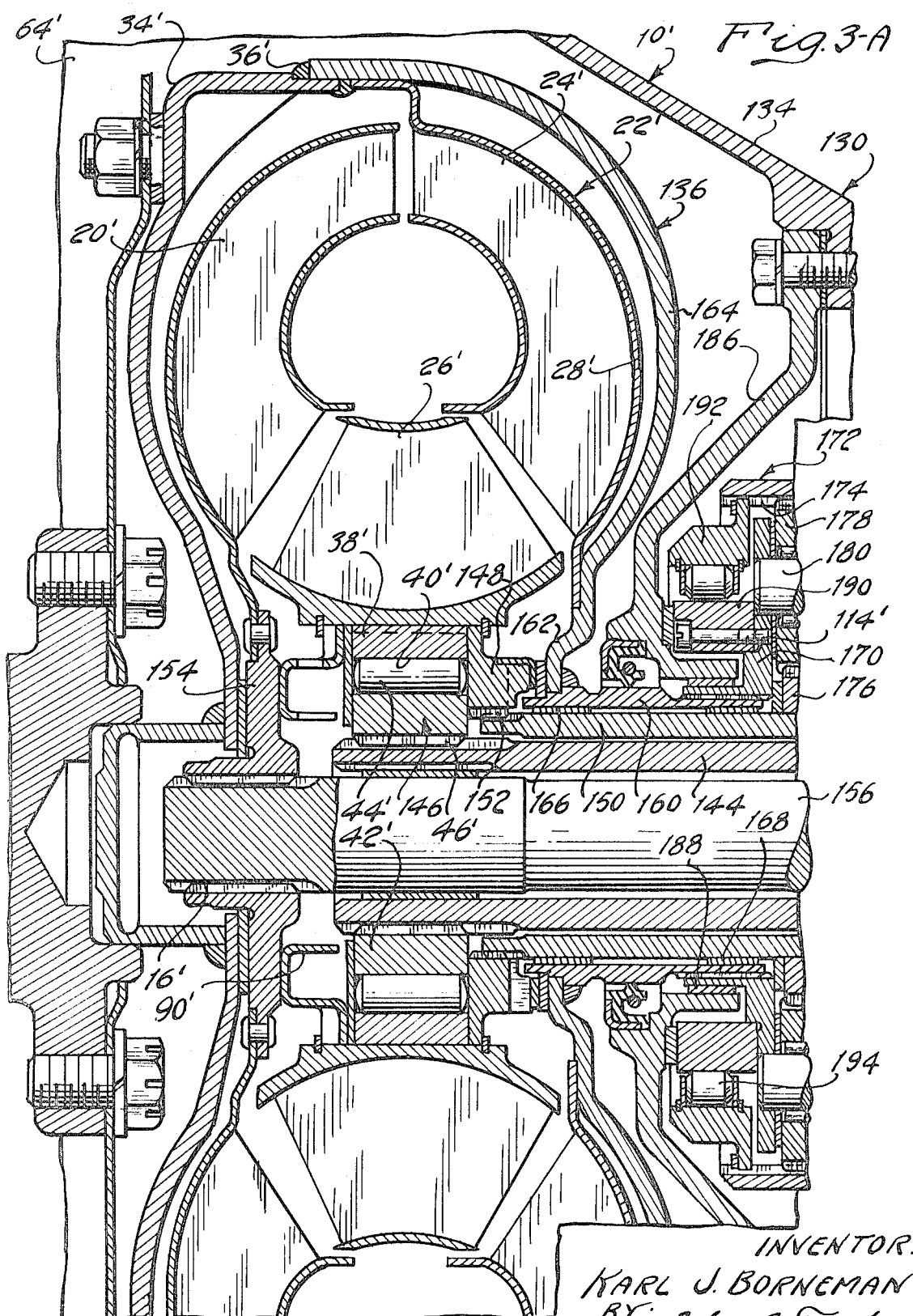

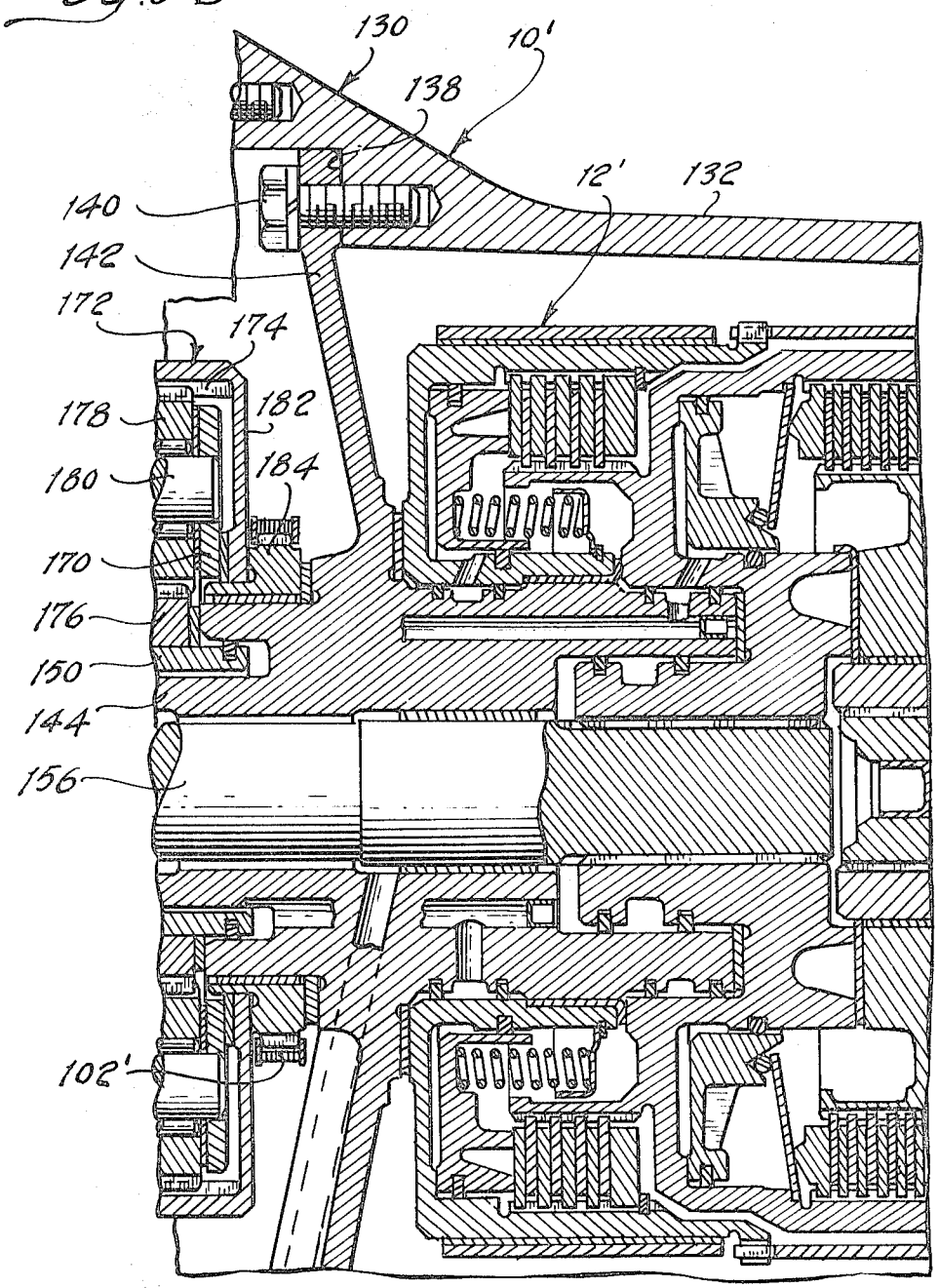

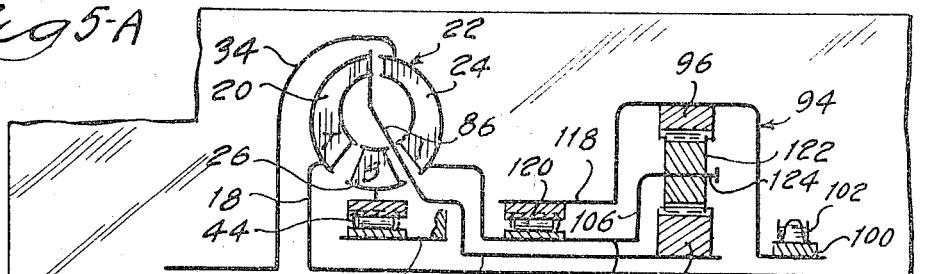
Fig 5-A
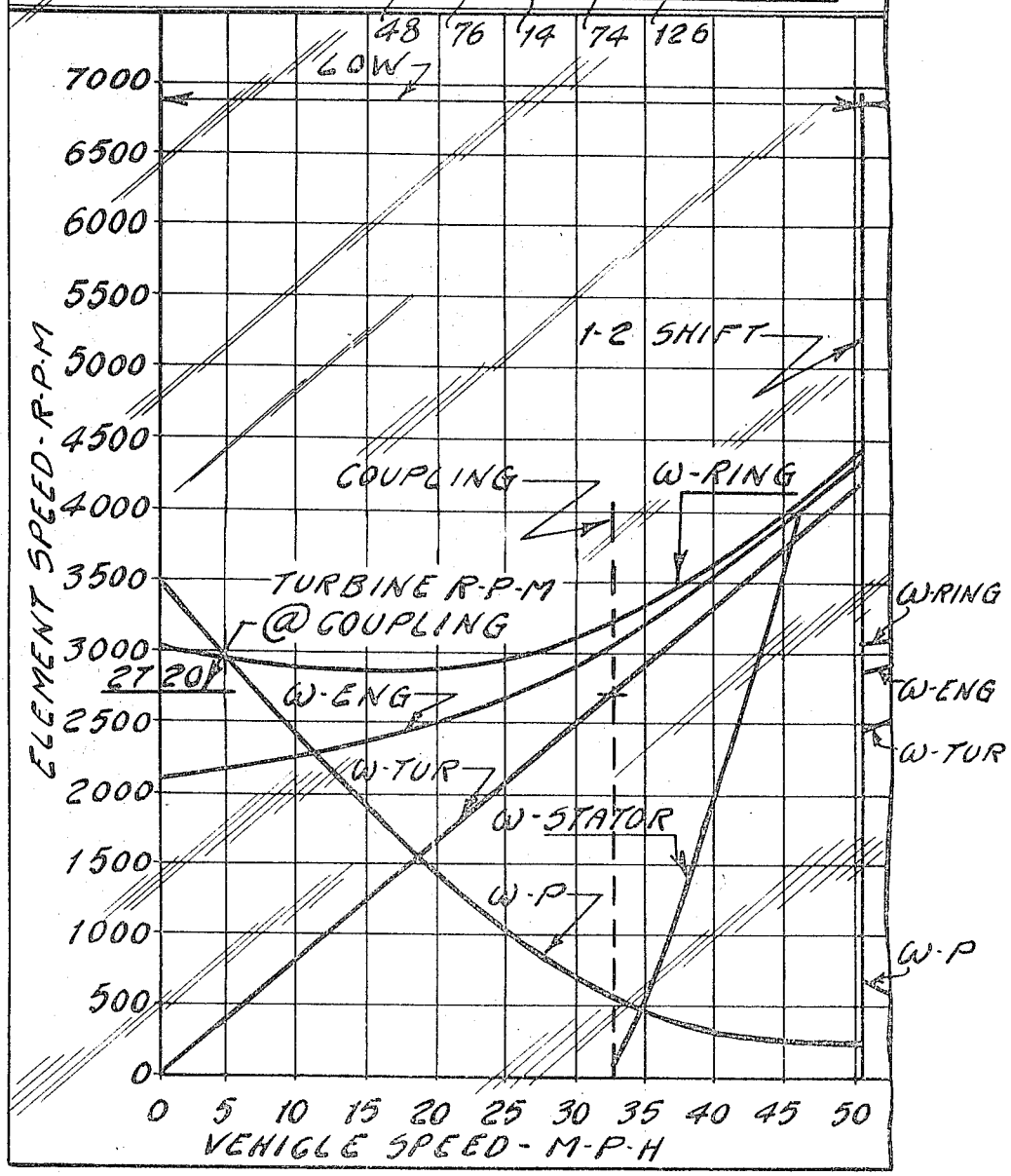

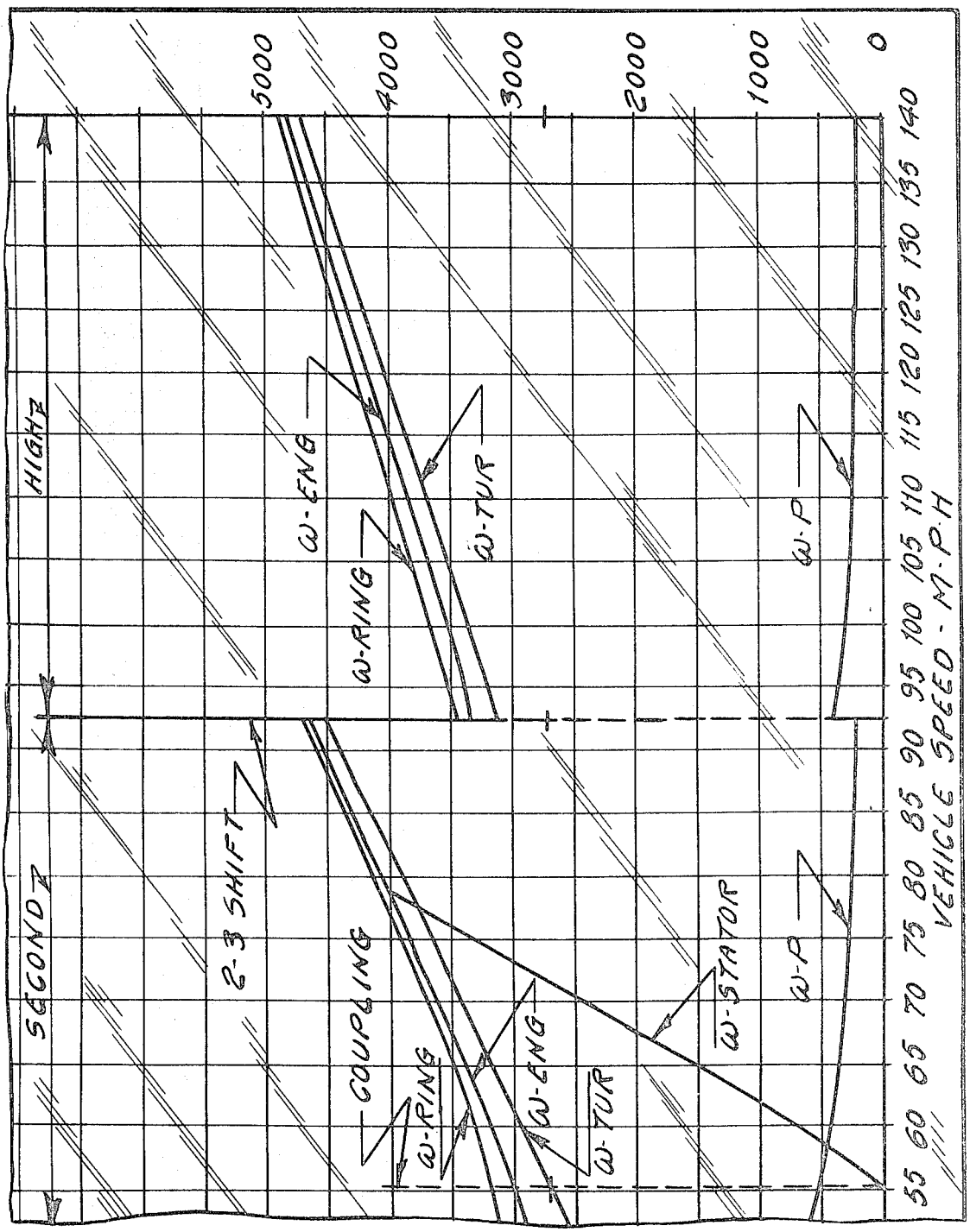

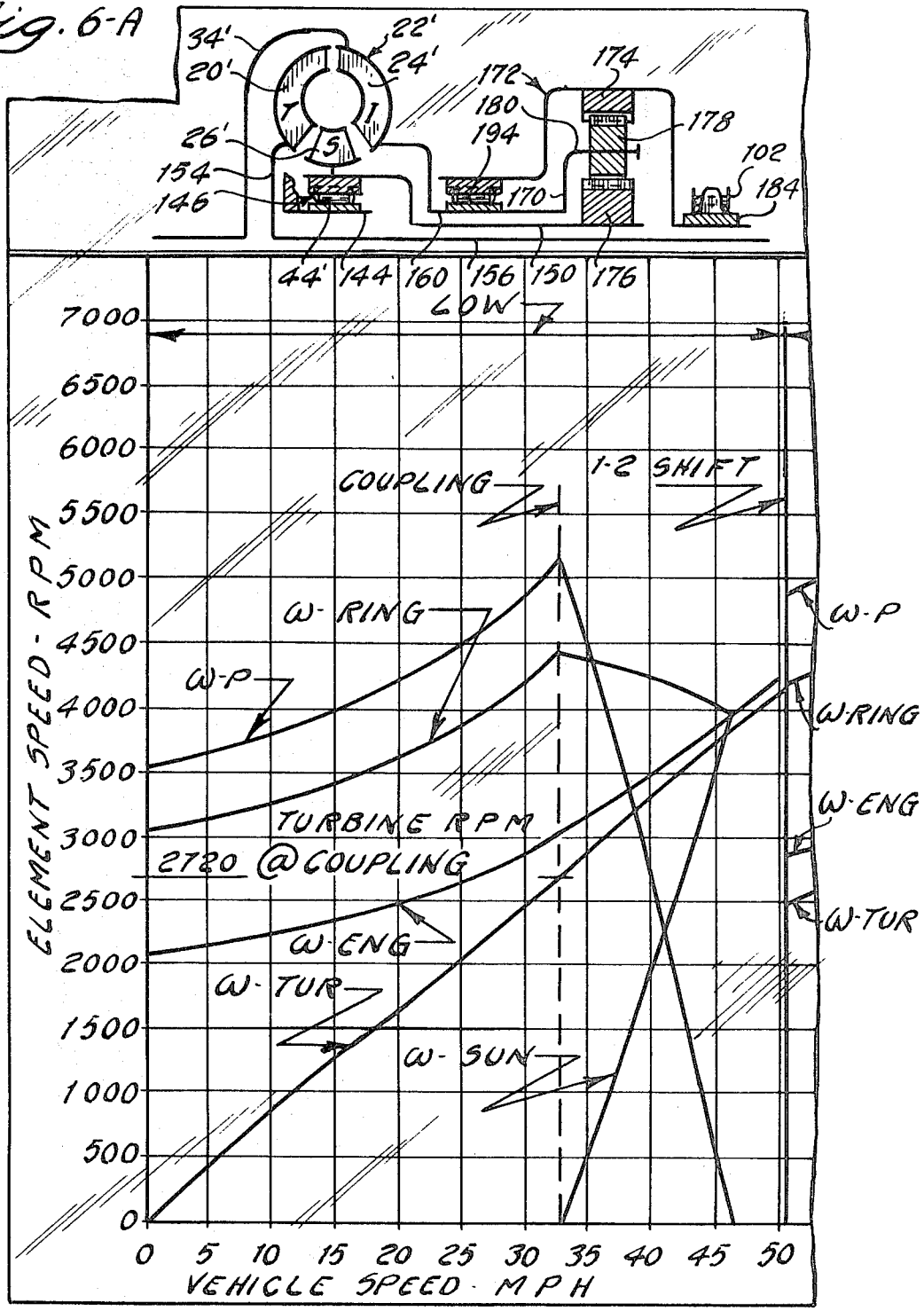

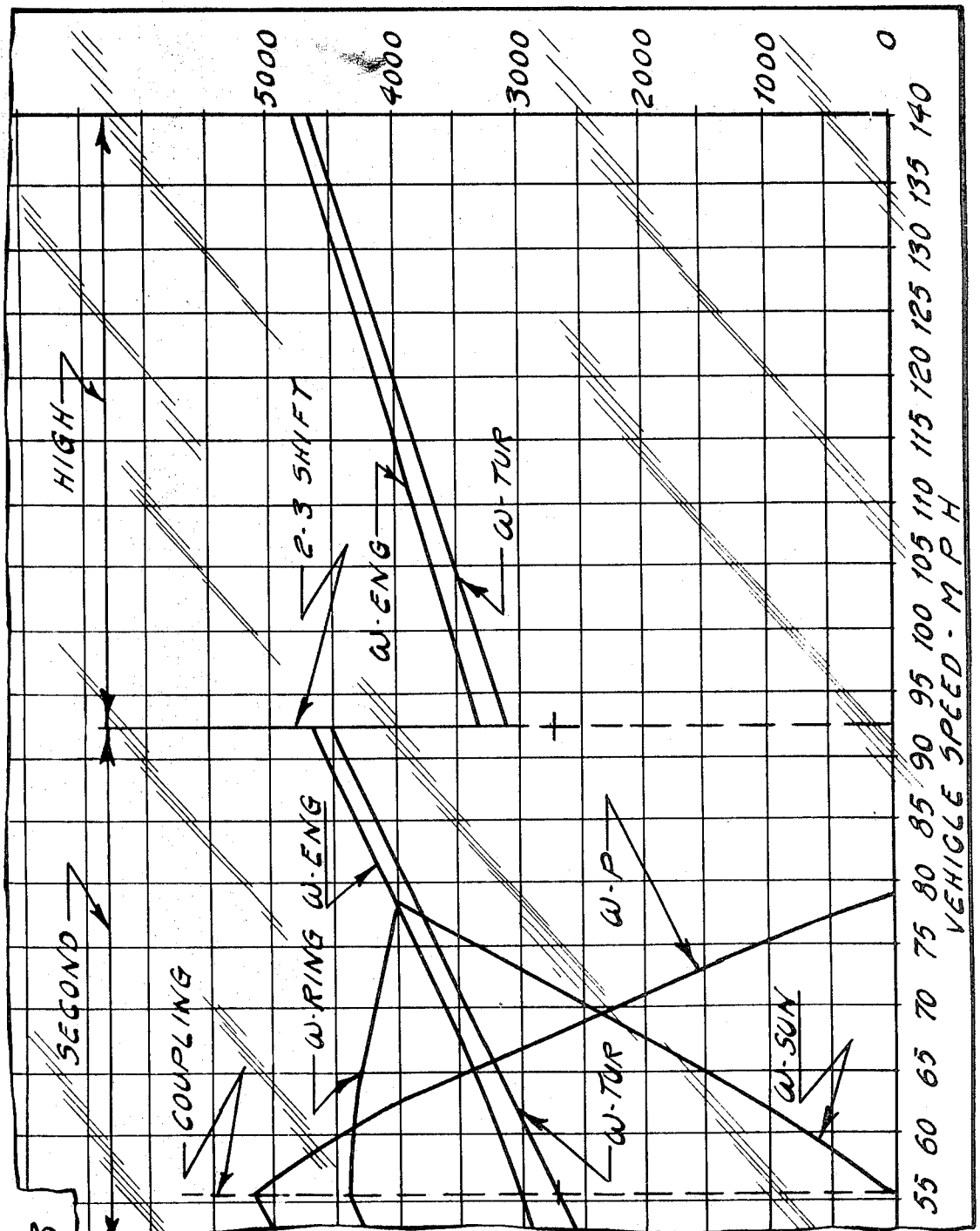

3,613,479
HYDROKINETIC TRANSMISSION AND ACCESSORY DRIVE
Karl J. Borneman, Detroit, Mich., assignor to
Ford Motor Company, Dearborn, Mich.
Filed July 6, 1970, Ser. No. 52,233
Int. Cl. F16h 47/00, 47/08
U.S. Cl. 74—688                                    7 Claims

ABSTRACT OF THE DISCLOSURE

A hydrokinetic power transmission mechanism for an automotive vehicle including an accessory drive for powering engine driven accessories, said accessory drive having an input member connected to one member of the hydrokinetic unit in the transmission mechanism and a reaction member connected to another member of the hydrokinetic unit whereby the ratio of the driven speed of the accessory drive to the speed of the power input member for the accessory drive is decreased when the hydrokinetic unit approaches a coupling condition.

GENERAL DESCRIPTION OF THE INVENTION

My invention may be applied to a hydrokinetic power transmission mechanism for an automotive vehicle driveline having an internal combustion engine with engine driven accessories. It is an improvement in accessory drives of the type shown in U.S. Pat. No. 2,959,070.

Engine driven accessories may include an electric voltage source such as a generator or alternator, a power steering pump, cooling fan, air conditioning compressor and water pump. The load imposed upon such accessories usually is highest when the engine is idling or is lugging at low speeds. If the torque transmitting driveline between the accessories and engine crankshaft is of a constant ratio, the output for the accessories often is inadequate for their intended purpose under these adverse conditions. If the driveline is designed with a speed ratio that is adequate to compensate for the increased demand imposed upon the accessories at low engine speeds, then the accessories are driven at excessive speed during operation of the engine in the higher speed range. This results in excessive horsepower loss.

The improvement of my invention is designed to eliminate the constant speed ratio drive condition and to provide an accessory drive in combination with a hydrokinetic unit which forms a part of the main torque delivery driveline whereby the variable speed ratios of the hydrokinetic unit affect the speed ratio of the accessory drive elements during operation of the vehicle at high speeds in any given transmission gear ratio. The hydrokinetic unit passes from a high torque multiplication speed ratio drive condition and approaches a coupling condition as the turbine speed of the hydrokinetic unit increases. This is accompanied, of course, by an increased engine speed. The variation in speed ratio affects the mechanical speed ratio of the accessory drive so that the speed of the driven member of the accessory drive approaches the speed of the engine during operation of the engine in a high speed range, although it is overdriven with respect to the engine when the engine speeds are lower. In this way it is possible to compensate for variations in the load requirements of the accessories as the engine speed varies.

In each of the embodiments disclosed in this specification, I have used a planetary gear system having an output ring gear element which is overdriven with respect to the engine. The reaction member of the planetary gear system is connected to a driven member of the hydrokinetic unit. During operation of the engine at high speeds, the reaction member rotates with its associated member of the hydrokinetic unit so that the over-all speed ratio of the accessory drive approaches unity. The overdrive ratio will decrease immediately, according to a preferred form of my invention, as the vehicle begins to accelerate from a standing start until the ratio of unity is approached. This characteristic is particularly useful when the vehicle uses a power steering system where the pressure requirements are much higher at stall than they are immediately following the instant when the vehicle begins to move.

GENERAL DESCRIPTION OF THE FIGURES OF THE DRAWING

FIGS. 1A and 1B show in longitudinal cross sectional form one embodiment of my invention including a hydrokinetic torque converter and a planetary gear unit situated between the torque converter and the torque transmitting gear elements of the vehicle driveline.

FIG. 2 is a schematic representation of the structure of FIGS. 1A and 1B.

FIGS. 3A and 3B are longitudinal cross sectional views of a second embodiment of my invention wherein the reaction member for the accessory drive is connected to the stator of a hydrokinetic unit.

FIG. 4 is a schematic representation of the structure of FIGS. 3A and 3B.

FIGS. 5A and 5B are a performance chart showing the speed relationships for the elements of FIGS. 1A and 1B with respect to vehicle speed.

FIGS. 6A and 6B are a performance chart corresponding to FIGS. 5A and 5B but indicating instead the speed relationship for the elements of the structure of FIGS. 3A and 3B with respect to vehicle speed.

PARTICULAR DESCRIPTION OF THE INVENTION

Numeral 10 designates a main transmission housing which encloses torque transmitting gear elements 12 for an automotive vehicle driveline. The torque input elements of the gearing 12 receive torque from centrally disposed turbine shaft 14 which is connected by spline 16 to turbine hub 18. This hub is connected to a bladed turbine 20 which forms a part of a hydrokinetic torque converter 22. Torque converter 22 includes also a bladed impeller 24 situated in toroidal fluid flow relationship with respect to the bladed turbine 20. A bladed stator 26 is located between the flow exit region of the turbine 20 and the flow entrance region of the impeller 24.

The impeller includes an outer shroud 28 to which the flow directing blades are attached. The inner hub of the shroud 28 is secured to the hub 30 of impeller shell 32. The outermost margin of the shroud 28 also is secured to the radially outward region of the interior surface of the shell 32. A shell cover 34 is secured by welding at 36 to the margin of the shell 32 thereby forming a closed fluid cavity within which the bladed members of the converter 22 are situated. The engine crankshaft, not shown, is connected directly to the shell part 34.

Bladed stator 26 includes a hub 38 having a central opening 40 which receives overrunning clutch race 42. Overrunning clutch rollers 44 are situated around race 42 within the opening 40. Race 42 is splined at 46 to relatively stationary sleeve shaft 48. Central opening 40 can be provided with cam surfaces against which the rollers 44 register in camming engagement thereby permitting freewheeling motion of the stator 26 in the direction of rotation of the impeller to prevent rotation of the stator in the opposite direction.

Sleeve shaft 48 surrounds the turbine shaft 14. It is connected to or formed integrally with flange 50 which is secured to supporting wall 52.

Ring 54 forms a part of the transmission housing. It is secured to wall 52. A shoulder 56 is formed on the forward end of the main housing 10 and the ring 54 is secured against the shoulder 56 by clamping bolts 58. The housing 10 and the ring 54 are provided with a cooperating, annular, pilot shoulder 60.

The converter 22 is surrounded by converter bell housign 62, which is bolted at its left-hand margin 64 to the engine block of an internal combustion engine. The right-hand end of the bell housing 62 is formed with an internal flange 66, which is bolted by the bolts 58 to the left hand side of the ring 54.

A bearing support wall 68 is secured by bolts 70 to shoulder 72 formed on the left hand side of the ring 54.

Sleeve shaft 74 is secured to the hub 30 of the impeller shell 32. It is journaled for rotation on sleeve shaft 76 by means of bearings 78 and 80. Sleeve shaft 76 in turn is splined at 82 to hub 84 to which is connected a turbine drive disk 86. This disk extends through the torus flow path of the converter 22 at a location intermediate the exit section of the stator 26 and the entrance section of the impeller 24. It is connected directly to the inner shroud of the bladed turbine 20. It is apertured to permit toroidal fluid flow therethrough with a minimum of flow resistance.

Thrust rings 88 and 90 are situated on either side of the overrunning clutch race 42 for accommodating the transfer of turbine and stator thrust forces. Thrust washers are situated on either side of the hub 84 between the impeller shell hub 30 and the thrust ring 88.

The ring 54 defines an internal cavity 92 within which is positioned accessory drive gearing 94. This gearing includes a ring gear 96 connected to a radial drive member 98. The hub of drive member 98 is connected drivably to sprocket wheel 100 about which may be positioned drive chain 102. Sprocket wheel 100 is journaled by means of bushing 104 on sleeve shaft 48. Drive chain 102 meshes with the teeth of the drive sprocket 100 and extends through an opening formed in the ring 54. An accessory drive shaft not shown is coupled to the sprocket 100 through the chain 102.

Gearing 94 includes also a carrier 106 which has a sleeve 108 splined to the sleeve shaft 74. Bushing 110 rotatably supports the carrier 106 on the support wall 68.

Overrunning clutch inner race 112 is secured to the carrier 106 by bolts 114. Thrust ring 116 is situated between the support wall 68 and the overrunning clutch race 112. Overrunning clutch roller elements 120 are situated between the races 118 and 112. Race 118 can be cammed to permit registry with the roller elements 120 thereby allowing the ring gear 96 to overrun the carrier 106 when the latter is driven. The overrunning clutch will prevent the carrier 106 from overrunning the ring gear 96.

Each pinion 122 is journaled rotatably on the carrier 106 between the pinion shaft 124. Pinions 122 engage also a sun gear 126 which is secured directly to sleeve shaft 76.

When the impeller of the converter is driven with the turbine stalled or with the turbine rotating at a relatively low speed, ring gear 96 overspeeds the carrier. The accessories then are driven at a relatively high speed whereby they are permitted to develop the necessary output to satisfy the load demands.

As the vehicle speed increases, both the impeller speed and the driven speed increase. The load demand on the accessories, however, decreases. The turbine 20, which serves as a reaction member during overdrive operation of the accessory drive gearing 94, increases in speed relative to the speed of rotation of the impeller 24 as the converter speed ratio increases. This results in a decrease in the effective degree of overdrive provided by the gearing 94. The overdrive ratio approaches unity as indicated in the chart of FIG. 5 as the vehicle speed increases. That is, the ring gear speed approaches the carrier speed when the converter approaches a hydrokinetic coupling condition. This coupling condition is indicated on the chart of FIG. 5A by a vertical dashed line, which in the particular embodiment disclosed occurs at a speed of approximately 33 m.p.h. The stator begins to rotate at this coupling point. At high speed ratios for the converter the stator speed approaches the impeller speed.

The ring gear speed equals the output speed for the accessory gearing as indicated on the chart of FIGS. 5A and 5B with the symbol $\omega$ ring. Symbol $\omega_p$ represents the speed of the planetary pinions. The symbol $\omega$ engine equals the impeller speed and the symbol $\omega$ turbine equals turbine speed.

When my invention embodies three speed ratio gearing, such as that shown in U.S. Pat. 3,362,261, three operating zones are provided. These are indicated in the chart of FIG. 4 as the low speed ratio zone having a low speed ratio of 2.46:1, a second speed ratio zone with a speed ratio of 1.46:1 and a high speed ratio zone with a direct drive 1:1 ratio.

I have shown in FIGS. 3A, 3B and 4 a second operating embodiment of my invention. The corresponding performance chart for this embodiment is indicated in FIGS. 6A and 6B. This chart resembles the chart of FIGS. 5A and 5B insofar as the speed relationships are concerned. The same nomenclature has been used to designate the various curves in FIGS. 6A and 6B.

In FIGS. 3A and 3B, I have shown a single piece transmission housing 130 that includes a main portion 132 and a bell housing portion 134, the latter enclosing a hydrokinetic torque converter 136 which may be a duplicate of the converter shown at 22 in the embodiment of FIGS. 1A and 1B. The housing 130 includes an internal shoulder 138 to which is secured by means of bolts 140, a bearing support wall 142. A stator sleeve shaft 144 is connected to the wall 142. The stator is supported on the shaft 144 and it is held against rotation in one direction by overrunning brake 146.

Overrunning brake hub 148 is connected directly to sleeve shaft 150 through splines 152. The turbine hub 154, which is connected directly to the bladed turbine 20 of the converter 22, is splined directly to turbine shaft 156 which in turn serves as a power input member for multiple ratio gearing of the type previously described.

Sleeve 160 is connected to the hub 162 of the impeller shell 164. Sleeve 160 is journaled by spaced bushings 166 and 168. Sleeve 160 is splined to carrier 170 of accessory drive gearing 172.

Gearing 172 includes ring gear 174, sun gear 176 and planet pinions 178 which are journaled on pinion shaft 180 supported by the carrier 170. Sun gear 176 is connected drivably to sleeve 150.

Ring gear 174 is connected to drive member 182 which in turn is connected drivably to sprocket wheel 184. A suitable drive chain registers with the wheel 184 to establish a torque transmitting driving connection between the ring gear 174 and the engine driven accessories.

Bearing support wall 186 cooperates with wall 142 to define a cavity within which the accessory drive gearing 172 is situated. Carrier 170 is journaled by bushing 188 within a central opening formed in the wall 186. An overrunning clutch race 190 is connected to the carrier 170. An outer overrunning clutch race 192 is connected to the ring gear 174. Overrunning roller elements 194 are situated between races 190 and 192 to prevent overrunning motion of the carrier 170 with respect to the ring gear 174. The overrunning clutch elements 194 will permit the ring gear to overrun the carrier, however, during normal torque delivery to the engine driven accessories.

During torque delivery through the gearing 172, sun gear 176 acts as a reaction member since it is connected to the stationary sleeve shaft 144 through the overrunning brake for the stator. During operation of the accessory drive with the torque converter in the torque conversion range, the stator is anchored, and the sun gear 176 then is permitted to act as a reaction point for the overdrive gearing. As soon as the stator freewheels, the accessory drive gearing 172 is capable of acting with a 1:1 speed ratio. This is illustrated in the chart of FIG. 6 where the ring gear speed falls after the coupling point is reached during acceleration until it crosses the line representing engine speed. When the vehicle is operating at a speed of approximately 47 mph, the ring gear speed substantially equals engine speed.

In the chart of FIGS. 6A and 6B, the sun gear speed is equal to the stator speed since those members are connected together.

What I claim and desire to secure by U.S. Letters Patent is:

1. In a combined hydrokinetic power transmission mechanism and accessory drive gearing for use in an automotive vehicle driveline having an internal combustion engine with powered accessories, a hydrokinetic unit having an impeller member, a turbine member and a stator member situated in toroidal fluid flow relationship, an accessory drive planetary gear unit, said gear unit including a ring gear, a sun gear, a carrier and planet pinions journaled on said carrier during meshing engagement with said sun and ring gears, said impeller member being connected to said carrier, the ring gear of said gear unit being connected drivably to said accessories, the sun gear of said gear unit being connected to another member of said hydrokinetic unit, a turbine shaft connected to said turbine and torque transmitting gearing connecting said turbine shaft to driven portions of said driveline.

2. A hydrokinetic power transmission mechanism for use in an automotive vehicle driveline having an internal combustion engine with powered accessories, an accessory drive gear unit, a hydrokinetic torque converter having an impeller, a turbine and a stator situated in toroidal fluid flow relationship, said impeller being connected to said engine, a turbine shaft connected to said turbine, said turbine shaft being adapted to be connected to driven portions of said driveline to complete a torque delivery path to said driveline, said accessory drive gear unit comprising a ring gear element, a sun gear element, a carrier and planet pinions on said carrier in meshing engagement with said sun and ring gears, said carrier being connected to said impeller, said turbine being connected to the sun gear element of said accessory drive gear unit, the ring gear element of said accessory drive gear unit being adapted to be connected to said accessories.

3. The combination set forth in claim 1 wherein said sun gear is connected to said stator thereby adapting it to function as a reaction element as said ring gear is overdriven upon torque delivery to said carrier, said stator including an overrunning brake means for inhibiting rotation of said stator in a direction opposite to the direction of rotation of said impeller but permitting freewheeling motion thereof in the same direction.

4. The combination set forth in claim 1 wherein said turbine is connected directly to said sun gear whereby the resistance to rotation of said turbine adapts said sun gear to function as a reaction element for said accessory drive gear unit when said converter is operating in the torque conversion range whereby said ring gear overruns said carrier, said ring gear being connected to said accessories.

5. The combination set forth in claim 1 wherein said accessory drive gear unit includes an overrunning clutch connection between said carrier and said ring gear whereby said ring gear is adapted to overrun said carrier during torque delivery from said impeller to said accessories but preventing overrunning motion of said carrier with respect to said ring gear.

6. The combination set forth in claim 3 wherein said accessory drive gear unit includes an overrunning clutch connection between said carrier and said ring gear whereby said ring gear is adapted to overrun said carrier during torque delivery from said impeller to said accessories but preventing overrunning motion of said carrier with respect to said ring gear.

7. The combination set forth in claim 4 wherein said accessory drive gear unit includes an overrunning clutch connection between said carrier and said ring gear whereby said ring gear is adapted to overrun said carrier during torque delivery from said impeller to said accessories but preventing overrunning motion of said carrier with respect to said ring gear.

References Cited
UNITED STATES PATENTS

| | | | |
|---|---|---|---|
| 3,277,746 | 10/1966 | Forster et al. | 74—730 |
| 3,311,200 | 3/1967 | Hayward | 74—688 X |
| 3,362,259 | 1/1968 | Hayward | 74—688 X |
| 3,391,584 | 7/1968 | Glamann | 74—674 |

ARTHUR T. McKeon, Primary Examiner

U.S. Cl. X.R.
74—677, 730